US008271877B2

(12) United States Patent
Allani

(10) Patent No.: US 8,271,877 B2
(45) Date of Patent: Sep. 18, 2012

(54) METHOD AND DEVICE FOR ACCESSING INFORMATION SOURCES AND SERVICES ON THE WEB

(76) Inventor: Ferid Allani, Kelibia (TN)

( * ) Notice: Subject to any disclaimer, the term of this patent is extended or adjusted under 35 U.S.C. 154(b) by 1206 days.

(21) Appl. No.: 10/169,355

(22) PCT Filed: Dec. 29, 2000

(86) PCT No.: PCT/FR00/03759
§ 371 (c)(1),
(2), (4) Date: Nov. 5, 2002

(87) PCT Pub. No.: WO01/50341
PCT Pub. Date: Jul. 12, 2001

(65) Prior Publication Data
US 2003/0120746 A1 Jun. 26, 2003

(30) Foreign Application Priority Data
Dec. 30, 1999 (FR) ..................................... 99 16704

(51) Int. Cl.
G06F 3/00 (2006.01)
G06F 3/048 (2006.01)
(52) U.S. Cl. ........ 715/713; 715/712; 715/733; 715/738; 715/739; 715/841; 715/853; 715/854; 705/26; 705/27
(58) Field of Classification Search .......... 715/712–713, 715/733, 738–739, 841, 853–854; 705/26–27
See application file for complete search history.

(56) References Cited

U.S. PATENT DOCUMENTS

| 5,930,769 A | | 7/1999 | Rose | |
| 5,933,827 A | * | 8/1999 | Cole et al. | 1/1 |
| 5,959,945 A | * | 9/1999 | Kleiman | 381/81 |

(Continued)

FOREIGN PATENT DOCUMENTS
EP 0847019 6/1998
(Continued)

OTHER PUBLICATIONS

XP002123655, CD ROM Professional, Riesman, "The Missing Link? (CD-ROM/Online Hybrids)", vol. 8, No. 4, Apr. 1995, pp. 66-68, 70-74.

(Continued)

Primary Examiner — Mark Rinehart
Assistant Examiner — Sajeda Muhebbullah
(74) Attorney, Agent, or Firm — Young & Thompson

(57) ABSTRACT

A method for accessing information sources and services on the Web, from a communication device connected via a network to the Internet. The method comprises: one or several steps of displaying a selection page among a plurality of selection pages in a treelike arrangement and stored locally, each selection page comprising a set of icons including one or several icons providing direct access to the information sources and one or several icons for accessing other selection pages; and a step which consists in transmitting, in response to a selection of an icon providing direct access in a selection page being displayed, the address of the information source corresponding to the icon. The invention is particularly useful in communication and office automation equipment, installed in public booths, in enclosed spaces or in private sites or for professional use.

19 Claims, 2 Drawing Sheets

U.S. PATENT DOCUMENTS

| | | | | |
|---|---|---|---|---|
| 6,032,130 | A * | 2/2000 | Alloul et al. | 705/14.34 |
| 6,072,492 | A * | 6/2000 | Schagen et al. | 715/733 |
| 6,456,303 | B1 * | 9/2002 | Walden et al. | 715/705 |
| 6,587,835 | B1 * | 7/2003 | Treyz et al. | 705/14.64 |
| 6,665,687 | B1 * | 12/2003 | Burke | 1/1 |
| 6,816,172 | B1 * | 11/2004 | Iki et al. | 715/716 |
| 6,868,525 | B1 * | 3/2005 | Szabo | 715/738 |
| 6,934,690 | B1 * | 8/2005 | Van Horn et al. | 705/26.2 |
| 7,454,706 | B1 * | 11/2008 | Matthews et al. | 715/713 |
| 2001/0014868 | A1 * | 8/2001 | Herz et al. | 705/14 |
| 2002/0089534 | A1 * | 7/2002 | Siekmann | 345/738 |
| 2004/0019610 | A1 * | 1/2004 | Burns | 707/104.1 |

FOREIGN PATENT DOCUMENTS

| | | |
|---|---|---|
| JP | 11-259496 | 9/1999 |

OTHER PUBLICATIONS

Wexler, Steve; The Official Microsoft HTML Help Authoring Kit: Understanding, Creating, and Migrating to Microsoft HTML Help; 1998; published by Microsoft Press.

Craig Stinson, "Windows NT Workstation Version 4.0 Official Manual", ASCII Corporation, Dec. 21, 1996, first edition, pp. 107-113.

Yohei Yamada, Internet ASCII, ASCII Corporation, Japan, vol. 4, p. 132, Oct. 10, 1999.

Tadatoshi Hirono, DOS/V Power Report, Japan, vol. 9, No. 11, p. 236, Nov. 1, 1999.

Yoshikazu Akutsu, Windows Start, Mainichi Communications Inc., Japan, vol. 5, p. 71, Nov. 29, 1999.

* cited by examiner

METHOD AND DEVICE FOR ACCESSING INFORMATION SOURCES AND SERVICES ON THE WEB

BACKGROUND

The present invention relates to a method for accessing information sources and services on the Web. It also relates to a device for implementing said method.

The use of Internet and the Web for accessing information and sources of every kind is presently drastically increasing. To permit access to Web sites providing said information and services, navigation software like Internet Explorer™ or Navigator™ have been widely diffused and nowadays equip every personal computer and workstation connected to Internet. These navigation software permit access to sites providing with search engines like Yahoo!™ or Voila™ allowing to emit requests in natural language and to receive in return a plurality of sites classified by decreasing relevance order. Furthermore, "portal" sites are presently developing, with a generalist or specialised objective, the function of which is proposing to a user on one hand direct accesses to some pre-selected sites and on the other hand accesses to headings. The choices of a site or of a heading are represented either by a designation or by an icon or a fixed or animated image. Pointing and clicking by means of a mouse on the corresponding active zone causes generating by the navigation software a Web address on Internet, permitting access to selected site, and within said site, to a document or a plurality of searched documents. In fact, in response to such a request, the requesting station can receive either directly a document, or usually a new HTML page containing itself a more and less high number of links among which the user will still have to make a new choice.

Now, a delay corresponds to each request-answer step, with a variable duration conditioned by non-controllable parameters like traffic on the network, jamming and power of servers in the consulted sites or also the memory size of the received pages. It results in a real discomfort felt by a number of Internet surfers, so far as to dissuade some of them from launching an information search that could prove to be long, tedious, and uncertain.

Furthermore, in addition to the above-cited problem of response time and search duration, the question of providing users that are not accustomed to computer tolls and Internet with a quick and easy access to information sources and services, also arises, while said quick and easy access is not properly provided by the generalist portals presently available on the Web.

Document EP0847019 discloses a method for selecting an item of information in an information processing system, wherein a user is provided with an access to two items of information through respectively two structures of multi-levels hierarchical menus. The second structure of menu comprises at least the sub-menus provided in the first structure of menu and the second sub-assembly includes at least the items of information included in the first sub-assembly. A user leaving the first structure of menu in a particular sub-menu enters the second structure of menu in a sub-menu that corresponds to this particular sub-menu.

SUMMARY

The aim of the invention is to propose a method for accessing information sources and services on the Web, that is quicker and easier to use than the present methods for accessing information on Internet, notably with a objective of integration within interactive terminals and office automation and communication equipments.

This objective is reached with a method for accessing information sources and services on the Web, from a communication device connected through a communication network to the Internet network, comprising:
  one or more steps for displaying a page of selection among a plurality of selection pages organized within a structure of tree menu and beforehand locally stored within said communication device, each page of selection comprising a set of icons and,
  a step for emitting on the communication network, in response to a selection of an icon in a page of selection currently displayed, the address of a source of information corresponding to said selected icon.

According to the invention, for each selection page, the set of icons includes one or more icons for directly accessing remote sources of information and/or one or more selection icons for locally accessing another selection page within said structure of tree menu,
  said addresses of information sources corresponding to direct access icons being beforehand locally stored in a table or base of addresses or
  locally generated in the progress of the display and selection steps.

Thus, by locally implementing preliminary selection steps in pages organized in a tree manner and operating as rolling menus, and by finally emitting on Internet only a complete address for accessing a well-targeted information source, the mean time duration observed for accessing searched information is drastically reduced. Besides, this method provides users poorly accustomed with computer tools and search engines with an efficient guiding to most of the useful information sources or to the most frequently consulted information sources.

These direct access icons can advantageously comprise icons for accessing merchant sites. This feature for example opens the way to customizing, with the colours of a commercial group, the access tool obtained by implementing the method according to the invention. These icons for directly accessing a merchant or institutional site can reproduce the logotype of this site.

The selection icons preferably include an item or thematic title opening an access to a page dedicated to a given activity or theme, and present graphic features that are distinctive from those of the direct access icons. The user is thus informed about the nature of the step that follows his selection. If is an icon with the "direct access icon" type, the next step will be a step for emitting an address towards a Web site. On the contrary, if it is an icon with the "selection icon" type, the next step will be a new selection step in a selection page.

The access method according to the invention can be advantageously provided for further comprising an updating of the plurality of selection pages locally stored. This updating can be achieved by downloading from a management server programmed for achieving this operation on a plurality of access devices or terminals implementing this method.

Furthermore, it is particularly advantageous to plan in the welcome page icons for selecting a consulting language among a plurality of proposed languages, for example under the form of flags for States wherein each proposed language is used. For that, several sets of selection pages beforehand stored each corresponding to a proposed language will be provided. This linguistic functionality represents another important advantage for the process according to the invention, since a user can thus locally achieve, in the language according to his choice, a preliminary search in the different themes, sub-themes or sub-categories, while in the conventional situation of a direct search on the Web, the same user would inevitably be confronted to the linguistic bar at one point or another.

According to another aspect of the invention, a device is proposed for accessing information sources or services on the Web, comprising means for communicating through a communication network on Internet, control and processing means, data storage means, display means, capture means, and pointing and selection means, said storage means containing a plurality of selection pages each comprising a set of icons.

This device is characterized in that, for each selection page, the set of icons includes one or more icons for directly accessing remote information sources and/or one or more selection icons for locally accessing another selection page within said structure of tree menu, and in that the control and processing means are programmed for:

controlling the display by said display means of a selection page in response to activating a selection icon provided for locally accessing another selection page within said structure of tree menu, and emitting on the communication network, in response to selecting a direct access icon in a selection page being currently displayed, an address of the information source corresponding to said selected direct access icon, said addresses of information sources corresponding to direct access icons being beforehand locally stored in table or base of addresses or locally generated in the progress of display and selection steps.

This device can be realized from a personal computer, a work station or from a network terminal, or can be installed within an apparatus dedicated to functions for accessing information sources and services on the Web. For example, it can be an Internet interactive terminal or an office automation and communication equipment installed either in a public booth in substitution of an existing phone device, or in places or public spaces or in private places or for a professional use.

BRIEF DESCRIPTION OF THE DRAWINGS

Other features and advantages of the invention will be apparent in the further description. The attached drawings are given as way of non limitative examples.

DETAILED DESCRIPTION

Figure 1:
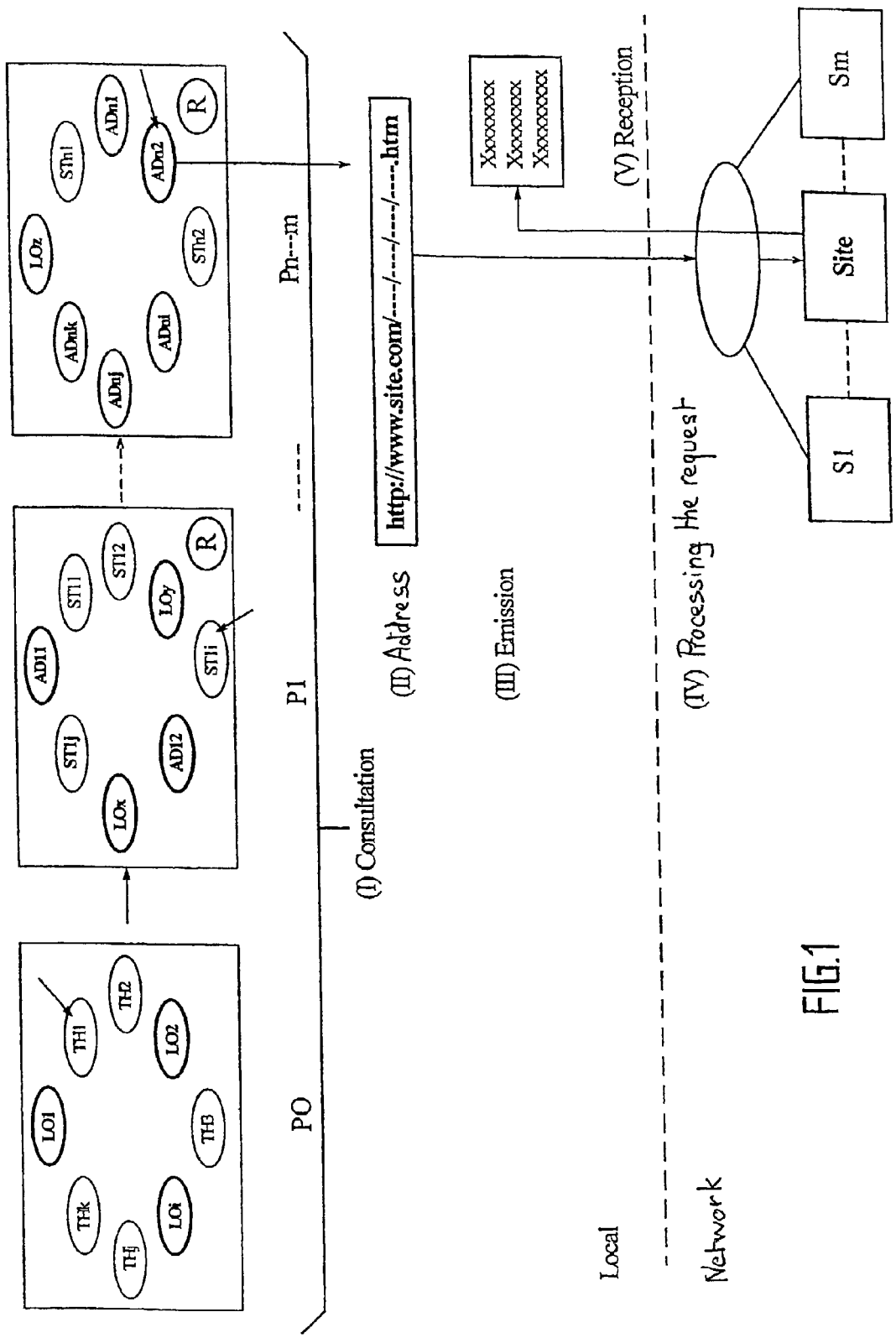
FIG. 1 is a synoptic scheme featuring the essential steps of the method according to the invention.

Now, with reference to FIG. 1, an example of use of the access method according to the invention, implemented in an Internet terminal or in an office automation and communication apparatus, is described.

A first page Po, displayed during the initialisation of the apparatus, for example contains:

icons LO1, LO2, . . . , Loi featuring logotypes, graphic or semi-graphic marks, merchant sites or portals for entering major commercial brands, for example a chain of hotels or restaurants or a large-scale distribution company, icons TH1, TH2, TH3, . . . , THj, THk each corresponding to a general purpose category or theme, for example sport, television, weather forecast or stock exchange.

Figure 2:
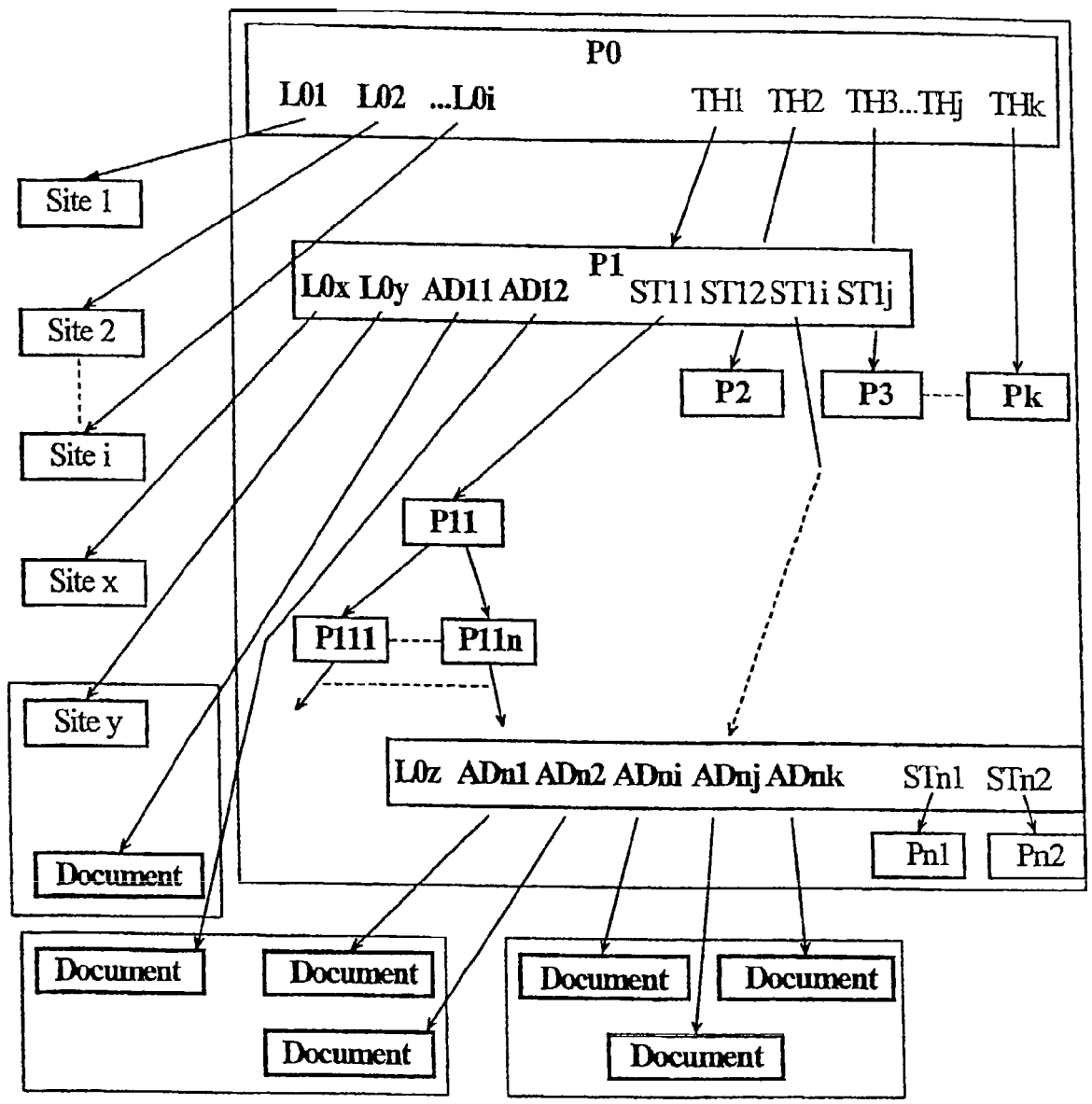
FIG. 2 features the mechanism for accessing on a tree mode the address of a searched information, implemented in the method according to the invention.

This first page Po constitutes the trunk of a tree structure schematically represented in FIG. 2 for the whole screen-pages locally stored in a storage unit, for example a hard disk unit or a CD-ROM, of the apparatus wherein this method is implemented.

If the user of the apparatus points on the icon of theme TH1, for example the SPORT theme, and clicks on this icon, a page P1 dedicated to the SPORT theme is then displayed. This page P1 contains for example:

an icon Lox for accessing a site dedicated to a plurality of sports and an icon Loy for accessing a site of a major soccer club, an icon AD11 "calendar" for directly accessing a weekly calendar of sport events provided on the above-cited multi-sport site, an icon AD12 "$1^{st}$ division games" for directly accessing to a document presenting the next matches of the $1^{st}$ division of soccer and provided by the official site of the soccer federation, icons ST11, ST12, . . . , ST1i, . . . , ST1j for selecting sub-categories or sub-themes, and an icon "Return" permitting to come back to initial page Po.

For example, it is assumed that the user of the consultation apparatus wherein the method according to the invention is implemented wishes to get the address and contact data of a club of supporters for a major basket ball team, with the intention of acquiring a shirt with the colours of this club and possibly booking places for the next championship final.

This user, after having selected the "SPORT" theme TH1 in the page Po, is naturally led to select the sub-theme ST1i "COLLECTIVE SPORTS", then, after a certain number of consulted pages, the user reaches a page Pn-m dedicated to the basket-ball championship. This page contains for example:

an icon LOz for accessing the official site of the basket-ball championship, an icon ADn1 for directly accessing the site of a rival team, an icon ADn2 for directly accessing the site of the Club of supporters for the searched team, icons ADnI, ADnj, ADnk for directly accessing other information sources linked to the basket-ball championship, and icons STn1, STn2 corresponding to sub-themes like "Training" or "Transfers".

Then the user selects the icon ADn2 "Club of supporters" and the activation of this icon causes generating (II) the complete address of the welcome page for this site, given as a way of non-limitative example: http://site.com/--/--/--/--.htm This address is then emitted (III) on the Web through the communication network to which the apparatus is connected, towards the concerned sire which, in return, sends a welcome page which is received (V) and displayed by the user who is the able to consult the searched information and achieve the desired order.

Thus the user has been able to access without any difficulty the information source being searched with a single request-answer sequence, the whole operations for selecting themes and sub-themes having been beforehand locally realized by means of the method according to the invention.

It has to be noted that the different consulted pages can advantageously include icons for accessing one or more search engines for permitting the user to take again as he likes the control of his searches on the Web.

Each selection page can also include usual consultation commands such as "WELCOME PAGE", "PRINT", "PREVIOUS PAGE", "NEXT PAGE", "END OF SESSION", "HELP". Moreover, especially when the method according to the invention is implemented in an office automation and communication apparatus, commands for office automation functions such as "PHOTOCOPY", "FACSIMILE", "E-MAIL" or "VISIO-CONFERENCE" can also be proposed.

Furthermore, it is easy to conceive a process for downloading, periodically or on demand, an updating of a set of pages used in the method according to the invention, from a management server towards a plurality of office automation and communication apparatuses wherein this method is implemented.

Of course, the invention is not limited to the examples that have been described and numerous adjustments can be provided to these examples without departing from the scope of the invention. Thus, the numbers of selection pages and of selection or direct access icons are of course not limited to the described examples. It is the same for the shape and the design of these icons that can be fixed or dynamic. Besides, the method according to the invention can be implemented in every fixed or mobile equipment that permits to access resources on Internet. In particular, the access method according to the invention can be implemented in mobile phone equipments of in electronic personal digital assistants including a function for accessing Internet.

The invention claimed is:

1. A method for accessing information- or service-providing web sites, from a mobile communication device connected through a communication network and provided with a display, comprising:
 a preliminary search for information or service, locally performed within said communication device in different themes and sub-themes within a plurality of successively displayed selection pages, said selection pages being organized in a structure of tree menu and beforehand locally stored within said communication device, each said selection page comprising a set of icons including one or more direct access icons for directly accessing an information- or service-providing web site and one or more selection icons for locally accessing and displaying another selection page within said structure of tree menu, wherein at least one of said selection pages comprises two or more direct access icons, and
 a step for emitting on the communication network, in response to a selection of a direct access icon in a selection page being currently displayed, an address of an information- or service-providing web site corresponding to said selected icon, said address being locally generated during the display and selection steps and directly accessing said information- or service-providing web site.

2. The method according to claim 1, characterized in that the locally generated addresses are locally stored in a table or base of addresses.

3. The method according to claim 1, characterized in that the locally generated addresses are generated in the progress of the display and selection steps.

4. The method according to claim 1, characterized in that the direct access icons comprise icons for accessing merchant sites.

5. The method of claim 4, characterized in that an icon for directly accessing a merchant site includes a logotype of said merchant site.

6. The method according to claim 1, characterized in that an icon for accessing a selection page includes a thematic title.

7. The method according to claim 1, characterized in that it further comprises an updating of the plurality of locally stored selection pages.

8. The method according to claim 7, characterized in that this updating is achieved by downloading from a management server.

9. The method according to claim 1, wherein said at least one selection page comprising two or more direct access icons comprises direct access icons corresponding to distinct sources of information or services.

10. The method according to claim 1 wherein said mobile communication device is a mobile phone.

11. The method according to claim 1 further comprising displaying on said display a page from a web site in response to selecting a direct access icon.

12. A device for accessing information- or service- providing web sites comprising a mobile communication device connectable through a communication network to the Internet, control and processing device or devices, data storage device or devices, a display, and pointing and selection device or devices, said storage device or devices containing a plurality of selection pages each comprising a set of icons, characterized in that, for each said selection page, the set of icons includes one or more direct access icons for directly accessing an information- or service-providing web site and one or more selection icons for locally accessing another selection page within a structure of a tree menu, wherein at least one of said selection pages comprises two or more direct access icons,
 and in that the control and processing device or devices are programmed for:
 enabling a preliminary search locally performed within said communication device in different themes and sub-themes within a plurality of selection pages organized in said structure of tree menu and beforehand locally stored in said data storage means within said communication device, each said selection page comprising a set of icons including one or more icons for directly accessing an information- or service-providing web site and one or more selection icons for locally accessing and displaying on the display means another selection page within said structure of tree menu, and
 emitting on the communication network, in response to selecting a direct access icon by the pointing and selection device or devices in a selection page being currently displayed, an address of an information- or service-providing web site corresponding to said selected direct access icon, said address being locally generated during the preliminary search and selection steps.

13. The device according to claim 12, characterized in that the control and processing device or devices are further arranged for locally generating addresses for information sources in the progress of preliminary search and selection steps.

14. The device according to claim 12, further comprising at least one document processor, characterized in that it is arranged for being installed in a public booth in substitution of an existing phone device.

15. The device according to claim 12, characterized in that the direct access icons comprise icons for accessing commercial sites.

16. The device according to claim 12, characterized in that the control and processing device or devices are arranged for receiving by downloading from a management server data for updating selection pages, and for processing said updating data so as that new selection pages are stored to be displayed.

17. The device according to claim 12, wherein said at least one selection page comprising two or more direct access icons comprises direct access icons corresponding to distinct sources of information or services.

18. The device according to claim 12 wherein said mobile communication device is a mobile phone.

19. The device according to claim 12 wherein a page from a web site is displayed on said display in response to selecting a direct access icon.

* * * * *